April 22, 1930.                E. F. ROBERTS                1,755,935
                           LOCK FOR MOTOR VEHICLES
                             Filed March 5, 1925
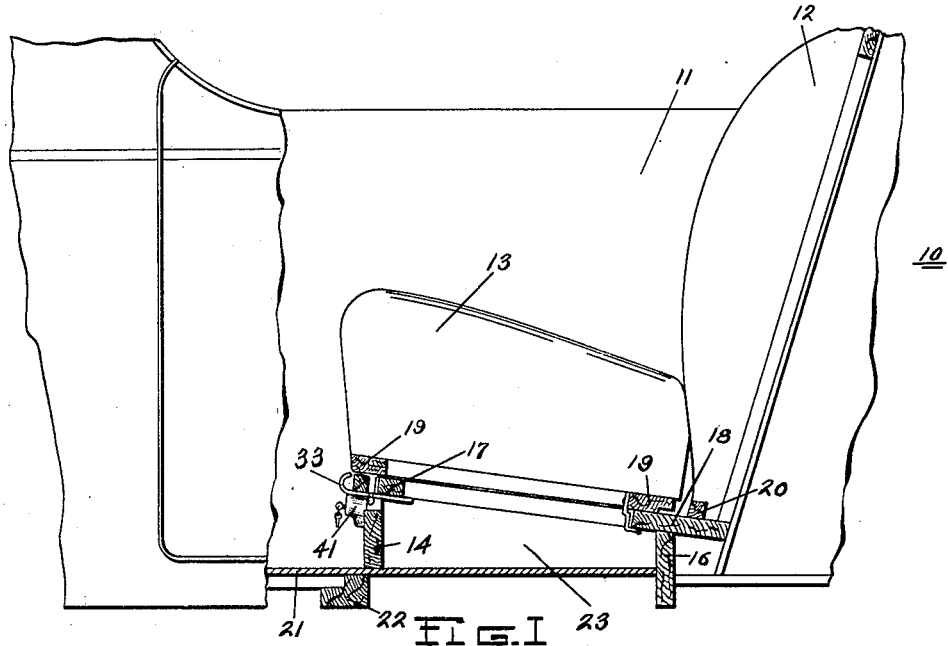
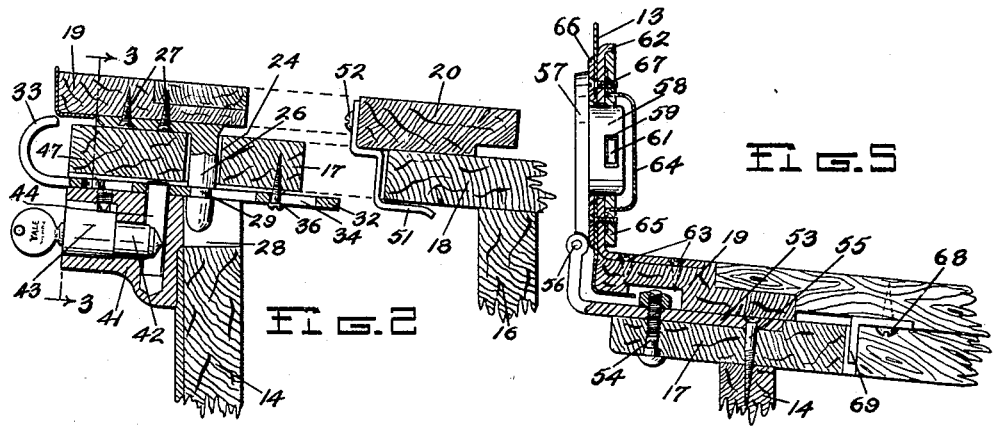
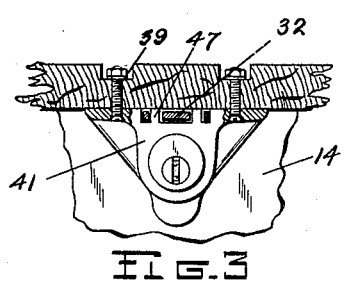
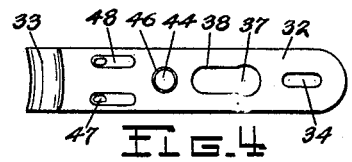
Inventor
Edward F. Roberts
By Milton Sittetts
Attorney Patented Apr. 22, 1930

1,755,935

UNITED STATES PATENT OFFICE

EDWARD F. ROBERTS, OF DETROIT, MICHIGAN, ASSIGNOR TO PACKARD MOTOR CAR COMPANY, OF DETROIT, MICHIGAN, A CORPORATION OF MICHIGAN

LOCK FOR MOTOR VEHICLES

Application filed March 5, 1925. Serial No. 13,045.

This invention relates to motor vehicles and particularly to the body construction thereof and it has for one of its objects to provide a novel and inexpensive mounting for the seats of such a motor vehicle body.

Another object of the invention is to provide a storage space or compartment for a motor vehicle which will form a support for the seat cushions of such a vehicle, and in which the cushion shall constitute the sole cover for the compartment.

A further object is to provide a motor vehicle with a seat cushion removably secured in position over a compartment to form a cover therefor, and a lock for preventing unauthorized removal of such cushion.

Other objects of the invention will appear from the following description taken in connection with the drawings, which form a part of this specification, and in which:

Fig. 1 is a view in side elevation of the forward portion of a motor vehicle body, partially in section and partially broken away, showing the application of the invention thereto;

Fig. 2 is an enlarged sectional detail of part of the structure shown in Fig. 1;

Fig. 3 is a detail view partially in section on the line 3—3 of Fig. 2;

Fig. 4 is a detail plan view of the locking plate or slide, and

Fig. 5 is a view similar to Fig. 2, illustrating a modified form of the invention.

In the construction of motor vehicle bodies it has heretofore been common practice to mount the seats thereof on supports more or less elevated above the floor of the vehicle body, and to utilize the space beneath the seats and above the floor for the storage of tools, curtains and other accessories. The battery for the lighting and ignition system of the vehicle has also frequently been mounted in the space so provided beneath the vehicle seats, and particularly is the front seat of the vehicle utilized for this purpose.

When a space of this nature is utilized for storage purposes it frequently happens that tools, batteries, and other detachable paraphernalia of considerable value, not attached to the vehicle, are placed therein, and it becomes desirable to provide a closure for such a compartment which may be locked to prevent unauthorized access thereto. To this end these compartments are frequently provided with hinged doors having locks whereby the contents of the compartment might be secured.

The frame on which the seats of motor vehicles are mounted ordinarily includes members which extend transversely of the vehicle body, and the forward edge of this frame is usually provided with a retaining strip or ledge by means of which the seat cushion is prevented from sliding forwardly on the frame. This seat cushion is ordinarily freely removable from its supporting frame and the loss of such cushions by theft and in other ways has been experienced.

These and other obvious shortcomings of the usual construction are obviated in the present invention in which the seat cushion is removably secured in place to serve as a cover or lid for the compartment or storage space within its frame. At the same time the construction of the seat frame is much simplified permitting the omission of the expensive cushion retaining strip.

Referring to the drawing, at 10 is shown a portion of the body of a motor vehicle having passenger seating compartment 11 in which is mounted a seat of well known form. This seat comprises a back portion 12, consisting of a cushion permanently secured to the frame members of the vehicle body in any convenient manner (not shown). The lower end of the seat back 12 is secured to a frame which constitutes the support for a seat cushion 13. In the form shown this frame comprises a pair of transverse members 14 and 16, on which are carried cushion abutments 17 and 18. The cushion 13 is provided with a suitable frame, the base of which is indicated by the members 19, on which is mounted the usual cushion springs and upholstery padding in a manner well known in the art to which this invention relates. A trim stick 20 may be secured to the abutment 18 to provide for attaching the upholstery of the back cushion 12.

The vehicle body 10 is provided with a floor 21, supported in the ordinary way upon the cross frame members 22 of the vehicle body, and this floor is extended beneath the frame members 14 and 16, defining therewith a space 23 which may constitute a compartment for the storage of tools, or curtains, the mounting of batteries, or other desirable purposes. It will be seen that the compartment 23 is completely closed except at its top, and the sole cover for this compartment is formed by the seat cushion 13.

The abutment member 17 at the forward portion of the seat frame is preferably drilled as indicated at 24 for the reception of a dowel pin 26 which is rigidly secured to the forward frame member 19 of the seat cushion in any convenient manner, as by means of the screws 27. The lower end of the dowel pin 26 projects into a recess 28 formed in the frame member 14 and is provided at a point near its lower end with a notch or groove 29.

Slidably mounted in the recess 28 below the lower face of the cushion abutment 17 is a lock plate or slide 32, having at its forward end a curved portion 33 adapted for use as a handle or a pull. The lock plate 32 is provided with a number of holes and slots most clearly shown in Fig. 4. Near the rear end of the plate is an elongated slot 34 by which the plate is slidably secured to the abutment 17, as by means of the screw 36. Forwardly of the slot 34 is a key-hole slot 37, the narrow portion 38 of which is adapted to engage in the notch 29 of the dowel pin 26. The larger portion at the rear end of the key-hole slot 37 has a diameter slightly greater than the diameter of the dowel pin 26, and this pin may be freely passed through this larger portion of the slot 37, as will be readily understood.

Suitably secured to the forward face of the frame member 14, as by means of the screws 39, is a lock 41 of any desired construction. In the form illustrated in Figs. 1, 2 and 3, this lock is of the well known cylinder type having a rearwardly extending portion 42, eccentrically mounted with respect to the axis of the main portion 43, and adapted to actuate a slidably mounted bolt 44. As the construction of the locks of this character is well understood, further description thereof is unnecesary. The upper end of the bolt 44 is adapted to engage in a hole 46 formed in the lock plate 32, when the device is turned to locked position, thus preventing withdrawal of the plate 32 in a forward direction. The forward portion of the lock structure is provided with a pair of upwardly projecting pillars 47, which engage suitable guide slots 48 in the plate 32.

The rearmost cushion frame member 19 is preferably provided with suitable means to prevent the raising of the rear end of the cushion independently of the front end. In the embodiment shown such means comprises hook shaped members 51, rigidly secured to the members 19 as by means of screws 52, and adapted to clip under and engage the rearmost abutment member 18 in a manner which will be apparent from an inspection of Fig. 2. The members 51 thus not only provide for the accurate positioning of the rear of the cushion 13 with respect to its frame but prevent removal of the cushion by initial lifting of the rear end thereof.

The operation of the mechanism above described will be readily understood. When the lock 41 is unlocked and the bolt 44 thereof is in its lowermost position, the lock plate 32 may be freely moved in the direction of its length a distance permitted by the travel of the screw 36 in the slot 34 and the pillars 47 in their slots 48. When the plate 32 is pulled out as far as possible, the dowel pin 26 will be disposed in the larger portion at the rear end of the key-hole slot 37, so that in this position the dowel pin may be withdrawn from the plate 32 and its hole 24, thus permitting removal of the seat cushion 13 in an upward and forward direction. With the slide in this same forward position the dowel pin 26 may also be passed through the large end of the key-hole slot 37 so that in this position the cushion 13 may be returned to its position on the abutment members 17 and 18. If now the plate 32 is pushed rearwardly, the narrow portion 38 of the key-hole slot 37 engages in the sides of the notch 29 thus preventing the withdrawal of the dowel pin from the plate and consequently preventing removal of the seat cushion from its frame. When the plate is moved to its rearmost position the lock bolt 44 is in alignment with the hole 46 therein, and by rotating the cylinder 43 of the lock 41 by its key, this bolt can be moved into engagement with the hole 46 to prevent movement of the plate 32. In this way it will be evident that the seat cushion 13 is not only rigidly positioned on the seat frame over the compartment 23 but may be positively locked in this position, thereby preventing unauthorized removal of either the cushion 13 or the contents of the compartment 23.

In the modification of the invention illustrated in Fig. 5, the upper face of the seat abutment member 17 is recessed for the reception of a metal strip or plate 53, which may be secured to the member 17 in any convenient way, as by the bolts 54 and screws 55. The forward end of the plate 53 is turned up in front of the cushion frame member 19 and is hinged, as at 56, to a lock supporting plate 57 on which is secured a lock 58 of the well known trunk type. This lock consists of a barrel having laterally disposed openings 59 in which bolts 61 are slidably mounted. The bolts 61 are extended and retracted through the openings 59 by suitable mechanism within the barrel (not shown), which is actuated by the key of the operator in the well known manner. The construction of locks of this type is well known in the art, and as it forms no part of the present invention further description is not deemed necessary. The forwardly disposed face of the seat cushion 13 is provided with a plate 62 having a portion suitably secured to the cushion frame member 19 as by means of screws 63. To this plate is secured a lock receiving member 64 into which the lock 58 may project, and the sides of this member 64 are provided with suitable recesses (not shown) in which the bolts 61 may engage to lock the parts. The receiving member 64 may be clamped, together with the material forming the covering of the seat cushion 13, between washers 65 and 66 in any appropriate way, as by the screws 67, an opening being provided in the cushion material to permit insertion of the lock 58 in the member 64.

Suitably secured to the lower face of the seat cushion frame in any convenient manner, as by the screws 68, is an angle member 69, the depending leg of which is adapted for engagement behind the rear face of the supporting abutment member 17. It will be evident that when the seat is in position on its frame with the angle member 69 disposed behind the abutment 17, and the lock 58 engaged in the member 64, that the cushion is retained in such position and cannot be moved from this position without unlocking the device.

It will be understood that various forms of the invention other than those described above may be used without departing from the spirit or scope of the invention.

What is claimed is:

1. In a lock mechanism, a member to be locked, a pin carried by the member, said pin having a groove, a slide movable relative to the member to be locked, said slide having a slot for coaction with the groove in the pin, a bolt movable transversely through the slide and means for locking the bolt.

2. In a lock mechanism, a member to be locked, a pin carried by the member to be locked, said pin having a groove, a slide movable inwardly and outwardly, a pull for the slide, said slide having a keyhole slot for coaction with the groove in the pin, a bolt movable transversely through the slide and means for locking the bolt.

3. In a lock mechanism, a member to be locked, a pin carried by said member, said pin having a groove, a slide having a curved end portion forming a pull, said slide movable inwardly and outwardly relative to the member to be locked and being provided with a key-hole slot for coaction with the groove in the pin, a bolt movable transversely through the slide and means for actuating and locking the bolt.

In testimony whereof I affix my signature.

EDWARD F. ROBERTS.